United States Patent [19]

Heilhecker et al.

[11] Patent Number: 4,836,302
[45] Date of Patent: Jun. 6, 1989

[54] APPARATUS AND METHOD FOR REMOVING AND RECOVERING OIL AND/OR OTHER OIL-BASED DRILLING MUD ADDITIVES FROM DRILL CUTTINGS

[76] Inventors: Joe K. Heilhecker, 4110 Belle Park Dr., Houston, Tex. 77072; Robert E. Williams, 4902 Milam, Houston, Tex. 77006; William H. Marshall, 305 Mayerling, Houston, Tex. 77024

[21] Appl. No.: 104,838

[22] Filed: Oct. 5, 1987

Related U.S. Application Data

[63] Continuation-in-part of Ser. No. 937,557, Dec. 3, 1986, abandoned.

[51] Int. Cl.[4] .................. B01D 11/00; B08B 3/08; C09K 7/00; E21B 21/06
[52] U.S. Cl. ........................ 175/66; 134/10; 134/40; 134/109; 210/634
[58] Field of Search ............... 175/66, 206; 252/8.51; 134/10, 13, 40, 109, 182; 210/634

[56] References Cited

U.S. PATENT DOCUMENTS

| | | |
|---|---|---|
| 2,870,990 | 1/1959 | Bergey . |
| 3,509,061 | 4/1970 | Zisman et al. . |
| 3,639,172 | 2/1972 | Keogh, Jr. . |
| 3,688,781 | 9/1972 | Talley, Jr. . |
| 3,693,733 | 9/1972 | Teague ........................ 175/66 |
| 3,716,480 | 2/1973 | Finley et al. . |
| 3,801,370 | 4/1974 | Porter et al. . |
| 4,027,731 | 6/1977 | Smith et al. ................. 166/267 |
| 4,040,866 | 8/1977 | Hondshine .................... 175/206 |
| 4,061,566 | 12/1977 | Modell . |
| 4,090,957 | 5/1978 | Leonard ....................... 210/634 X |
| 4,118,313 | 10/1978 | Hadamovsky et al. ........ 210/634 |
| 4,124,528 | 11/1978 | Modell . |
| 4,139,462 | 2/1979 | Sample, Jr. .................. 175/66 X |
| 4,147,624 | 4/1979 | Modell . |
| 4,175,039 | 11/1979 | Fisher . |
| 4,189,376 | 2/1980 | Mitchell . |
| 4,209,381 | 6/1980 | Kelly, Jr. ..................... 175/66 X |
| 4,210,461 | 7/1980 | Moree et al. ................. 134/40 X |
| 4,304,609 | 12/1981 | Morris . |
| 4,341,567 | 7/1982 | Roehl ........................... 134/40 X |
| 4,349,415 | 9/1982 | DeFilippi et al. . |
| 4,375,387 | 3/1983 | DeFilippi et al. . |
| 4,383,884 | 5/1983 | Rozmus . |
| 4,391,711 | 7/1983 | Jackson et al. ................ 210/634 |
| 4,395,338 | 7/1983 | Rowton . |
| 4,411,074 | 10/1983 | Daly . |
| 4,434,028 | 2/1984 | Eppig et al. . |
| 4,451,377 | 5/1984 | Luxemburg . |
| 4,476,036 | 10/1984 | Figiel et al. ................... 134/40 X |
| 4,517,108 | 5/1985 | Hisamoto et al. ............. 134/40 X |
| 4,546,783 | 10/1985 | Lott . |
| 4,595,422 | 6/1986 | Hill et al. ...................... 175/206 X |
| 4,599,117 | 7/1986 | Luxemburg . |
| 4,599,187 | 7/1986 | Hey . |
| 4,606,283 | 8/1986 | DesOrmeaux . |
| 4,645,608 | 2/1987 | Rayborn ........................ 175/66 X |
| 4,683,963 | 8/1987 | Skinner ......................... 175/66 |

FOREIGN PATENT DOCUMENTS

| | | | |
|---|---|---|---|
| 1019239 | 10/1977 | Canada . | |
| 899840 | 1/1982 | U.S.S.R. ................... | 175/206 |

Primary Examiner—George A. Suchfield

[57] ABSTRACT

Method and apparatus for removing oil-based drilling mud from drill cuttings in order to prepare the drill cuttings for an environmentally safe disposal in the sea. A solvent in the range of solvents which may be condensed by ambient seawater and vaporized by heated internal combustion engine coolant is utilized in the process. The method of this invention includes the steps of transporting oil-based mud-laden cuttings to a solid feed tank wherein the oil-based cuttings are subjected to turbulent mixing to leave the surface of the cuttings substantially free of oil. The cuttings are then transported to a countercurrent flow column and subjected to countercurrent, laminar flow of solvent in order to separate oily solvent and fines smaller than a chosen diameter from the heavier solids. The heavier solids are cleaned of any remaining oil-based muds, separated from cleaning solvent and ultimately returned to the sea environment. The method includes the further step of treating the oil-based mud laden solvent for separation of remaining solvent for return of the solvent to the continuous process and for recycling of the recovered oil-based drilling mud into the drilling mud system.

43 Claims, 1 Drawing Sheet

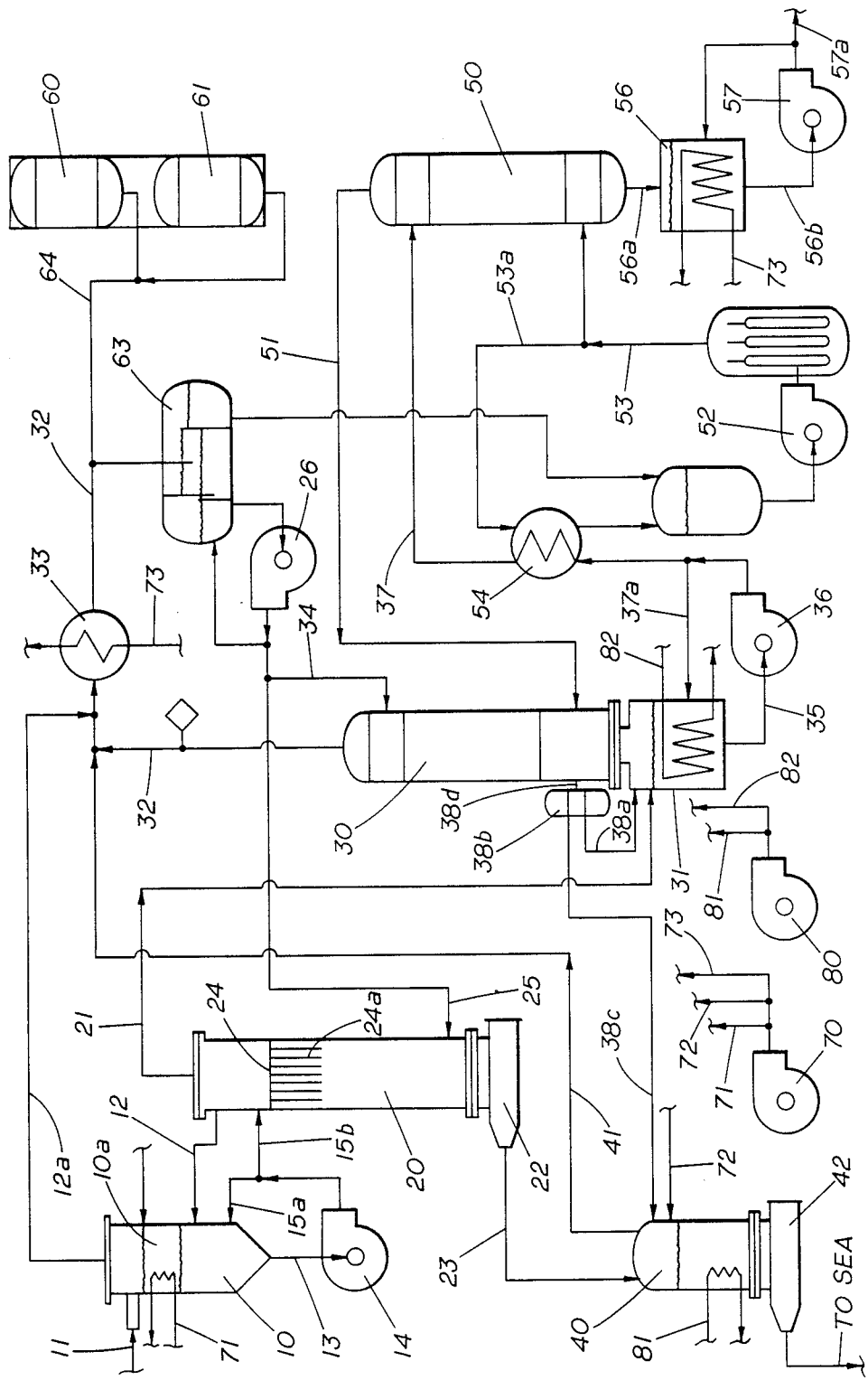

APPARATUS AND METHOD FOR REMOVING AND RECOVERING OIL AND/OR OTHER OIL-BASED DRILLING MUD ADDITIVES FROM DRILL CUTTINGS

RELATION TO OTHER APPLICATIONS

This application is a continuation-in-part of U.S. patent application Ser. No. 937,557 filed Dec. 3, 1986, now abandoned, and entitled Apparatus and Method for Removing Oil and/or Other Oil-based Drill Cuttings and Recovering Removed Oil or Other Additives.

FIELD OF THE INVENTION

The present invention relates to apparatus and method to remove oil and/or other mud additives from the drill cuttings generated from downhole oil and gas drilling operations.

BACKGROUND OF THE INVENTION

In the drilling of oil and gas wells, drilling fluids or "muds" are used to provide well bore lubrication, to cool the drill bit, to protect against corrosion and to provide a pressure head to maintain formation integrity. There are two main types of drilling muds: water-based and oil-based. Oil-based drilling muds are employed in operations where it is desirable to drill at elevated temperatures, improve bore hole stability, control shale sloughing, and control water wetting of the formation such as in clay and some shale formations. Oil-based drilling muds are also desirable in "sour gas" wells where the water in a water-based drilling mud can react with the formation sulfur compounds and cause hydrogen embrittlement of the steels employed in the drilling operations. Oil-based drilling muds also inhibit corrosion and provide superior lubrication of the drill pipe in the well bore such as, for example, during directional drilling operations often conducted from offshore platforms.

Drilling muds are typically circulated down the inside of a tubular drill string, outwardly through the drill bit and up the annulus between the drill string and the bore. Drilling muds serve to carry the drill cuttings away from the bit and out of the bore hole. A typical oil-based drilling mud includes a diesel or mineral oil base, oil soluble emulsifiers, water (often salt water), oil wetting agents such as calcium sulfonates and organic amines to provide for oil wetting of the solids, and additives to control leak-off into the formation such as gilsonite and organophilic clays. The density of the drilling mud is adjusted with weighting agents such as barite or hematite. Oil-based drilling muds are very stable oil external-water internal emulsions including wetting agents to hold solids such as drill cuttings in the oil phase. The drill cuttings thus tend to become oil wet, trapping large quantities of oil-based mud in their intergranular spaces and creating environmental concerns regarding disposal of the contaminated drill cuttings.

For example, uncleaned drill cuttings which are dumped offshore can cause substantial pollution as the oil is gradually released from surface adhesion to the drill cuttings. Because the industry and the U.S. government want to avoid any such oil pollution, regulations governing the disposal of drill cuttings or solids have been promulgated.

In the prior art, drill cuttings contaminated with oil-based drilling muds were often collected in settling tanks where re-usable drilling mud was drawn off the top of the tank and contaminated drill cuttings, as bottoms, were transported to appropriate disposal sites. Such storage and transportation operations are costly and environmentally undesirable especially in offshore drilling operations. Typically, oil contaminated cuttings contain about fifty percent (50%) by volume of oil-based liquid. The value of this large volume of entrained oily liquids is considerable, and there is a strong economic incentive to recover the oil-based drilling mud both for economic as well as environmental reasons. Further, even burying of such oil-covered drill cuttings at waste disposal sites on shore is undesirable since the oil may eventually leach off the surface of the drill solids and enter subsurface water supplies.

Several different methods for processing drill solids contaminated with oil-based mud have been attempted. For instance, U.S. Pat. Nos. 3,688,781; 3,693,733; 3,716,480; 4,175,039; 4,546,783 and 4,645,608 teach the use of aqueous solutions of detergents in an attempt to wash adsorbed oil-based mud from the surface of the drill cuttings. These methods have been largely unsuccessful because oil-based muds are specially formulated with powerful oil wetting agents that resist the detergent action of aqueous wash solutions. Additionally, detergent-laden water, which may be even more toxic to marine organisms than the oil on the drill solids, is continuously discharged into the marine environment.

U.S. Pat. Nos. 4,209,381 and 4,395,338 teach the use of steam to strip the more volatile oils from oily drill cuttings, followed in some cases by distillation of the remaining solids to remove the higher boiling oil fractions. The methods are impractical offshore because of the excessively high energy requirements to generate the quantity of steam needed and the high temperatures needed to distill the oil.

U.S. Pat. Nos. 4,139,462; 4,304,609; 4,411,074 and 4,606,283 all teach various thermal methods to heat the oil-laden solids to drive off the oil as a vapor. Typically, the high temperatures required for these processes is supplied by electrical resistance heating, electrical induction heating, infra-red heaters, or high temperature heat transfer fluids. The methods have been at least partly unsuccessful for reasons already cited. The total amount of energy to heat all of the solids and boil all of the liquids off the cuttings is excessively high. Also, it is very dangerous to operate any equipment offshore in which hydrocarbon vapors are generated at temperatures well above their flash point.

U.S. Pat. No. 4,040,866 teaches the use of a mutual solvent to clean oily drill cuttings. A mutual solvent is one that is soluble in both oil and water. In this process, oily liquid is removed from the solids with a mutual solvent like ethylene glycol monobutyl ether; however, the mutual solvent remains on the cuttings and must be washed away with water leaving the cuttings free of oil and solvent. This method has proven impractical because two undesirable process streams are created. Large quantities of solvent (approximately equal to the original volume of oily liquid on the solids) are washed from the solids with water and discharged with the water into the environment. It is probable that the solvent is even more toxic to marine organisms than the oil which was removed from the cuttings. Additionally, large volumes of mutual solvent become contaminated with dissolved oil and must be either discarded or purified and recycled. The cost of mutual solvents prohibits simple disposal. Further, the high boiling point and high latent heat of vaporization of mutual solvents make their separation from oil by distillation difficult, expensive and hazardous.

U.S. Pat. No. 4,434,028 teaches a high pressure process for the use of a solvent which is miscible with oil but essentially immiscible with water to clean oily drill cuttings. In this process, a substance that is typically a gas at ambient temperature and pressure is compressed sufficiently to convert the gas to a liquid which then becomes a suitable solvent for the oil associated with drill cuttings. The liquified gas is then flowed, batchwise, through a vessel packed with oily solids. When the solids have been washed sufficiently clean, the chamber is depressurized allowing the solvent to flash into a vapor, leaving the solids free of oil and solvent. The oil-contaminated solvent can also be flashed to a vapor to separate it from the oil and allow it to be recycled. This process has not been successful on offshore drill sites for several possible reasons. High pressure is required to convert the normally gaseous material to a liquid so it can dissolve the oil on the solids. Mechanical problems associated with moving solids repeatedly into and out of high pressure vessels without leakage are formidable. Also, the batchwise nature of the process is not compatible with the continuous process of drilling and generation of drill cuttings. Finally, mechanical crushing of the cuttings prior to extraction requires heavy, bulky, maintenance-prone equipment which is especially undesirable for uses in offshore drilling operations.

SUMMARY OF THE INVENTION

Briefly, the present invention relates to a new method and apparatus for the separation of oil-based drilling mud from drill cuttings and recovery of the drilling mud for reuse. The present invention employs a solvent in the range of solvents which may be condensed by ambient seawater and vaporized by heated internal combustion engine coolant and may be incorporated into such a separation process without the necessity of pressures substantially above or below ambient pressure. The method of this invention includes the steps of transporting oil-based mud-laden cuttings to a solid feed tank wherein the oil-based cuttings are subjected to turbulent mixing with solvent to dissolve the oil associated with the cuttings and leave the surface of the cuttings substantially free of oil. The cuttings are then transported to the countercurrent flow column and subjected to a countercurrent flow of clean solvent in order to separate oily solvent and fine solids smaller than a chosen diameter from the heavier solids. The heavier solids are cleaned of oil including oil previously trapped in the intergranular voids in the solids. The solids now containing solvent in the intergranular voids are subjected to heat to vaporize out the solvent leaving the cleaned solids to be returned to the sea environment. The oil-laden solvent from the separation column is thereafter distilled so that substantially pure solvent is removed from the mixture thus leaving a residuum of oil, fine solids and a small amount of solvent. The residuum is then subjected to steam stripping to remove substantially all of the remaining solvent thus leaving a substantially usable oil-based mud to return to the mud system. In this manner, the oil of the oil-based mud and other desirable fine particulate are removed from the cuttings so that the cuttings can be discharged to the sea environment and the oil-based mud and desirable solids can be reused in the mud system for the oil well.

BRIEF DESCRIPTION OF THE DRAWINGS

The FIGURE is a partially schematic diagram illustrating the process and apparatus of a preferred embodiment of this invention.

DESCRIPTION OF THE PREFERRED EMBODIMENT

The apparatus employed in practicing a method of the preferred embodiment is illustrated in the FIGURE. Basically, the apparatus includes a solids feed tank 10; a cleaning column 20; a bulk recovery or distillation column 30; a hot seawater tank 40; and, a stripping column 50. The apparatus further includes a solvent supply tank 60 and a solvent makeup tank 61. The utility water pump 70 is provided for pumping cooling water, which in the preferred embodiment of this invention is seawater at ambient conditions, to various vessels and locations to be further described later. A second general application pump 80 is provided to pump heated internal combustion engine or jacket coolant to various vessels and locations to be further described later.

Typically, the drill cuttings circulated through the mud system on an offshore oil well drilling platform are covered by oil-based drilling mud on all external surfaces and further have oil-based drilling mud trapped within the intergranular spaces or voids of the drill cuttings. The method and apparatus of this invention are provided for removing the oil-based drilling mud both from the surfaces and from the intergranular spaces of the drill cuttings. The principal cleaning solvent utilized in the process and apparatus of this invention is a low boiling point organic compound that is substantially miscible with oil and substantially immiscible with water. A preferred solvent has a low latent heat of vaporization between 50 and 250 BTU/pound and boiling point between 100°–180° F. so that the solvent can be vaporized or distilled using principally waste heat from a drilling rig, such as the heated coolant from the drilling rig's diesel engines, which typically has a temperature of about 190° F. or within the range of about 170° F. to 210° F. Furthermore, the solvent should be condensible utilizing ambient seawater at about 75° F., or in the range for ambient seawater or other coolant of about 65° F.–85° F. In some special situations, such as in Arctic regions, ambient seawater may be close to 32° F. Coolant at this temperature is even more desirable than coolant in the typical range of seawater temperatures. Further, it is important that such a solvent must be in a liquid state at ambient temperature and pressure in order to allow operation within the method and apparatus of this invention to be accomplished substantially at atmospheric pressure or less in order to prevent loss of the solvent into the atmosphere. The particular solvents utilized in the preferred embodiment of this invention are preferably but not limited to solvents that are non-flammable and non-toxic so that their use on a drilling rig presents no safety concerns. Such preferred solvents are halogenated hydrocarbon solvents such as trichloro-trifluoroethane (Freon 113), of E.I. DuPont de Nemours & Co. (having a heat of vaporization of 63 BTU/pound), methylene chloride, ethylene dichloride, perchloroethylene, chloroform, methylchloroform, carbon tetrachloride, trichlorotrifluoroethane/methylene chloride azeotrope and other azeotropes of these or similar compounds.

Referring to the FIGURE, a slurry of oil-based drilling muds and cuttings enters the apparatus of this invention through line 11. The drill cuttings in this slurry typically contain about 50% by volume of oil-based drilling mud absorbed within the intergranular spaces or voids of the drill cuttings. The drill cuttings may have already been subjected to some type of settling tank to allow some part of the oil-based drilling mud to separate by gravity from the drill cuttings in order to reduce the amount by volume of oil on the drill cuttings as described. However, it is within the scope of this invention to utilize the method and apparatus of this invention with oil-based drill cuttings which are taken directly out the mud-circulation system of the offshore drilling rig.

The drill cuttings enter through line 11 into the solids feed tank 10 and therein are subjected to a solvent washing action in order to remove substantially all of the oil-based drilling mud from the surface of the drill cuttings. The solids feed tank 10 also receives oil-laden solvent and fine solids recycled from the cleaning column 20 through line 12 which extends from the top of the cleaning column 20. The bottom outlet line 13 of the solids feed tank is attached to solid feed pump 14 which includes a recirculating line 15a and a transfer line 15b for transferring a slurry of oily solvent and washed drill cutting solids into the top of the cleaning column 20. The utility water or cooling pump 70 includes an output line 71 which circulates ambient seawater through heat exchange tubes in the solids feed tank 10 in order to cool a blanket of water, shown schematically as 10a, which in turn can cool the cuttings to a temperature below the boiling point of the solvent. Additionally, the cool water blanket will condense any solvent vapor that may be created by contact with inadequately cooled solids. Line 12a is a safety line in the event any solvent vapors escape the water blanket 10a. Line 12a connects to line 32 for recovery of clean solvent as will be later described. The contaminated drill cuttings are mixed with solvent in the solids feed tank and are stirred vigorously to create turbulent conditions to dissolve the oil associated with the drill cuttings. The stirring is accomplished by circulating the slurry of solvent and drill cuttings through pump 14 and returning the enhanced pressurized slurry through recirculating line 15a back into the solids feed tank 10. Other means of mechanical agitation to create turbulence may also be utilized. The turbulence is necessary to de-agglomerate the drill solids and to substantially wash the oily liquid from the surface of the drill cuttings or solids before the cuttings enter into the cleaning column 20. The amount of recirculation is controlled by valves in lines 15a and 15b or other suitable flow control means. Typically, about 80% of the solvent-solids slurry is recycled through the pump 14 in order to provide that the drill cutting solids are passed through the pump 14 about five times before entering line 15b to the cleaning column 20. This turbulent cleaning action is desirable because it ensures that the solid particles or cuttings are repeatedly subjected to high shear forces which enhance dispersion and inhibit agglomeration of the solid particles. High shear in the presence of a miscible solvent also assures that substantially all of the oil-based drilling mud is displaced from the surface of the cuttings and is dissolved in the solvent before the solids are sent through line 15b to the cleaning column 20. Thus the mixture of oily solvent and washed solids entering the cleaning column 20 through line 15b contain drill cuttings and solids which are substantially free of oil-based drilling mud at their surface so that further cleaning may be particularly directed to the easier task of removing the film of oily solvent and any remnants of oil-based mud from the surface of the cuttings. This operation can be performed under condition of substantially laminar flow.

Referring now to the cleaning column 20, outlet line 21 is attached to the top of the cleaning column to transfer oil-laden solvent, including fine solids from the drilling mud such as barite, organophilic clays and other desirable fine solids in addition to drill cutting fine solids. Line 21 transfers this slurry to an inlet into reboiler 31 attached to the bottom of the bulk recovery or distillation column 30.

A cleaning column transfer pump 22 is mounted onto the bottom of cleaning column 20 in order to transfer outwardly of the column through line 23 a slurry of solvent and substantially oil-free solids which enter into the top of the hot seawater tank 40.

The cleaning column 20 is a cylindrical vessel and includes a plate 24 having a plurality of downwardly extending tubular members 24a of a particular design diameter to be described. Clean solvent is fed continuously into the bottom of the cleaning column 20 through inlet line 25 which is also an output line for pump 26. As the solids rain downwardly in the upwardly flowing solvent within the cleaning column 20, the solids are progressively cleaned. As the liquid solvent flows upwardly through the cleaning column, it dissolves more and more oil and oily solvent off of the surface and out of the pores of the drill cuttings. Oil-free solids exit continuously from the bottom of the cleaning column 20 while the oil-laden solvent including fine solids in a mixture or slurry exit outwardly through outlet line 21. The cleaning column 20 provides a continuous countercurrent solvent extraction step employing a solvent, such as Freon-113, which is essentially completely miscible with oil and essentially immiscible with water. The countercurrent contact within the column 20 of the downwardly moving flow of solids with an upwardly moving stream of clean solvent is a preferred method for performing this step in the cleaning operation.

When the solvent-solids slurry enters the cleaning column through line 15b from the solids feed tank 10, the solids begin to fall or rain downwardly through the upwardly flowing solvent because of their greater density. Dirty carrier solvent mixes with the upwardly flowing clean solvent and both flow out of the top of the column. The solvent mixture exits as two separate streams 12 and 21 with identical composition. Stream or line 21 goes to reboiler 31 attached to the bottom of the bulk distillation column 30 where pure solvent is recovered for recycle. The second stream 12 flows back to the solids feed tank 10 to be reused as a wash and carrier solvent for the drill cuttings.

As the finely divided, solvent-washed solids fall downwardly through the cleaning column they are preferably made to pass through the one or more tubular orifices 24a which act as a solids classification zone. For a given cross-sectional area of the orifice tubes 24a, the upward countercurrent flow rate of clean solvent can be adjusted to give any desired upward linear velocity inside the orifices tubes. By proper selection of the upward velocity of solvent, one can cause particles smaller than a certain diameter to rise with the solvent while allowing particles larger than the critical size to fall against the upward flow of solvent.

The critical particle diameter which will be suspended by the rising liquid is determined by Stoke's Equation. This equation can be expressed as follows:

$$d^2 \text{(crit)} = (18\eta v)/(g\Delta\rho)$$

where:
- d = diameter of the particle in cm
- η = viscosity of the fluid in poises
- v = velocity of the liquid stream in cm/sec
- g = the acceleration of gravity in cm/sec$^2$
- Δρ = difference in density between the solid particle and the moving liquid in grams/cm$^3$ The ability of the cleaning column 20 to separate solids according to their size is desirable because it allows one to force all the barite, organophilic clays, and other desirable fine solids, which make up an oil based mud, to flow out of the top of the column in line 21 to be recovered and recycled. The larger undesirable solids, now cleaned of oil-based drilling mud, are caused to flow out of the bottom of the cleaning column 20 in line 23 to the hot seawater tank 40 for subsequent discharge into the sea. Unlike other countercurrent washing processes where turbulence in the column is desirable to enhance washing action, turbulence in the cleaning column of this invention is undesirable and should be substantially avoided. Stokes Equation applies to particles moving in a stream of fluid in laminar flow. If turbulence is introduced into the column, the sharp separation of solids prescribed by Stokes Equation is compromised.

The oil solvent mixture containing fine solids smaller than some chosen diameter, such as about 40 microns for barite and 70 microns for drill solids, flow out of the top of the cleaning column 20 through line 21 and into reboiler 31 attached to the bottom of the distillation column 30.

The hot seawater tank 40 is an enclosed cylindrical vessel which receives the solvent and substantially oil-free solids from the cleaning column through cleaning column transfer pump 22. The hot seawater tank 40 is heated through line 81 extending from the heating water pump 80, which line 81 circulates through the hot seawater within the tank 40 in order to vaporize any remaining solvent associated with the cleaned drill solids. Such vaporized solvent exits the tank 40 through exit line 41 and connects into distillation column exit line 32. Makeup seawater is provided for the tank 40 through line 72 from utility water pump 70. The low boiling solvent associated with the cleaned solids is flashed in the hot seawater tank 40 thus leaving the cleaned drill cuttings or solids in hot seawater which is pumped outwardly by pump 42 to the sea. Thus the larger solids of the drill cuttings have now been discharged to the sea environment free of the oil-based drilling muds and solvent. The exiting vaporized solvent in line 41 joins with exiting vaporized solvent from distillation column line 32 to pass through a condenser 33 such that the condensed solvent enters clean solvent collection tank or accumulator 63. The cooling fluid for condenser 33 is provided through line 73 from the utility pump 70 which provides ambient seawater for condensing the vaporous solvent in line 32. Additional solvent is provided to line 32 and accumulator 63 through line 64 which extends from the solvent supply tank 60 and to the extent necessary from solvent makeup tank 61 to provide the necessary amount of cleaned solvent for the process. Solvent pump 26 pumps the clean solvent through line 25 to the bottom of the cleaning column 20 and through line 34 into the top of the distillation column 30.

The reboiler 31 is attached to the bottom of the distillation column 30 and contains heating coils through which hot jacket water is pumped from pump 80 through line 82. Heat from the hot jacket water is used to distill the solvent for recovery and reuse. The bulk recovery or distillation column 30 thus heats the oil-laden solvent containing fine solids received through line 21 from the top of cleaning column 20 to distill out of the slurry from line 21 solvent which exits through line 32 and is condensed in condenser 33 for collection in clean solvent collection tank 63 for subsequent reuse. A stream of residuum, containing oil-based mud and solvent exits outwardly of reboiler 31 through line 35 and is pumped by pump 36 through line 37 to the top of the stripping column 50. A recirculation line 37a is provided to recirculate any desired portion of the exiting residuum of oil-based mud and some of the solvent. Some of the water that is also vaporized in the reboiler 31 is internally condensed in column 30 and is withdrawn with some liquid Freon through line 38d to a standard Freon-water separator tank 38b (where the two substantially immiscible liquids separate by difference in density) so that the water is circulated into the hot seawater tank 40 through line 38c for ultimate discharge to the sea. Liquid Freon separated in 38b is recycled into the reboiler 31 through line 38a. Vaporized solvent also enters the bottom of the distillation column 30 from line 51 which is the exit line at the top of the stripping column 50 for returning any remaining vaporized solvent into the distillation column 30 for further purification and eventually for return and collection within the collection tank 63.

The purpose of the steam stripper column 50 is to remove any remaining amount of solvent within the oil-based mud and desirable fine solids exiting from line 35 of the reboiler 31. The stripping column 50 is heated by steam provided by steam generator 52 which provides steam to the bottom of the stripping column 50 through line 53. A branch line 53a of line 53 connects to a stripper preheater 54 for preheating the slurry of oil-based mud residuum and solvent before entering the stripping column 50.

A reclaim oil cooler 56 is attached to the bottom of the stripping column 50 and receives the oil-based mud and fines exiting through line 56a from the bottom of stripping column 50. Cooling water is provided through line 73 connected to the cooling water pump 70 in order to cool down the reclaimed oil-based drilling mud including desirable solids for return to the drilling mud system through pump 57. Pump 57 is connected to reclaimed oil cooler exit line 56b for transferring through pump output line 57a the reclaimed oil-based drilling mud and desirable solids back into the drilling mud system for reuse in drilling the well. By using greater or lesser amounts of steam provided by the steam generator 52, the concentration of solvent remaining in the oily mixture entering through line 37 can be reduced to any desired low value. After the steam stripping, the still bottoms exiting column 50 now have essentially the same composition as the liquid that contaminated the drill cuttings originally and may be recycled into the mud system for reuse. The vaporized solvent is returned from the stripping column 50 through line 51 to distillation column 30 for ultimate recycle in the continuous process of this invention.

It should be understood that the foregoing description and drawing of the invention are not intended to be limiting, but are only exemplary of the inventive features which are defined in the claims. For example, it is within the scope of this invention to utilize the method and apparatus of this invention for the removal of oil-soluble pollutants from contaminated soil such as might occur from leaking gasoline tanks, leaking PCBs from discarded transformers or leakage of other hazardous waste which are polluting the earth. In general, the process of this invention is well-suited for the removal of an oil-soluble phase from intimate admixture with an oil insoluble phase. For example, the process may be used for the regeneration of activated charcoal or other adsorbents, the extraction of commercial entities from natural products such as vegetable oil from seeds, caffeine from coffee grounds and flavors and essences from plants. There are also circumstances in which water-based muds may be utilized in offshore or in other areas wherein the water-based muds contain oil added for lubricity. It is to understood that the term "oil-based muds" as used herein includes such water-based muds having oil added for lubricity or for other reasons.

What is claimed is:

1. A process for cleaning oil-based drilling mud from drill cuttings in order to prepare the cuttings for environmentally acceptable disposal, which comprises the steps of:
   a. collecting drill cuttings which are contaminated with drilling mud;
   b. contacting the contaminated drill cuttings with a solvent for the drilling mud, which solvent is liquid at ambient temperature and pressure, substantially miscible with oil, and substantially immiscible with water, to dissolve drilling mud in the solvent, to provide drill cuttings which are sufficiently free of oily contamination for environmentally acceptable disposal and leaving drilling mud laden solvent;
   c. moving the environmentally acceptable drill cuttings to the environment;
   d. heating the drilling mud laden solvent to vaporize the solvent from the drilling mud;
   e. recovering the drilling mud for further handling; and
   f. condensing the vaporized solvent for recycle in the process by heat transfer with environmentally available fluid at ambient temperatures.

2. The process of claim 1, wherein said contacting step includes:
   the contaminated drill cuttings are substantially immersed in said solvent and are subjected to turbulent flow conditions to substantially break any agglomeration of cuttings and expose the surfaces of said drill cuttings to said solvent to produce a mixture of partially clean drill cuttings and solvent.

3. The process of claim 2, wherein said contacting step further includes:
   said partially clean drill cuttings and solvent mixture are subjected to countercurrent flow of solvent to further clean the cuttings of drilling mud such that the cuttings are covered by solvent and are thus free of drilling mud.

4. The process of claim 3, wherein:
   separating oil-based drilling mud fines of a predesignated mass from the heavier drill cuttings by the countercurrent flow of solvent to produce a stream of oil-laden solvent and a stream of heavier drill cuttings substantially covered with solvent.

5. The process set forth in claim 1 or 4, wherein:
   said process is continuous.

6. The process of claim 1 wherein:
   heat for heating and vaporizing the solvent is extracted from waste heat available at the drilling site.

7. The process of claim 1 wherein:
   heat for heating and vaporizing the solvent is extracted from engine coolant from internal combustion engines at the drilling site.

8. The process of claim 1 wherein:
   solvent is mixed with collected, contaminated drill cuttings to dissolve drilling liquids and to form a slurry prior to removal of drill cuttings from the solvent.

9. The process of claim 1 wherein said contacting step includes:
   exposing the drill cuttings to solvent flow under conditions substantially in accordance with Stoke's Equation to separate finer particles from contaminated drill cuttings to remain with the solvent and to remove larger solids from contaminated drill cuttings to settle from the solvent and be removed.

10. The process of claim 1 wherein:
    vaporized solvent is condensed by heat transfer with seawater.

11. The process of claim 1 wherein:
    the recovered drilling mud is recycled into drilling mud available for drilling.

12. The process of claim 1 including:
    removing the drill cuttings sufficiently free of oil contamination from contact with the solvent and removing any remaining solvent from the drill cuttings and discharging the drill cuttings into the environment.

13. The process of claim 12 wherein:
    the drill cuttings are discharged into seawater.

14. The process of claim 1 wherein:
    the heating to vaporize includes first distilling said drilling mud laden solvent to remove solvent leaving a mixture of oil-based drilling mud and some solvent, and stripping said oil-based drilling mud and some solvent with steam to remove any remaining solvent to leave drilling mud which is recycled to the mud system at the drilling site.

15. The process of claim 1 wherein:
    the solvent has a boiling point between about 100° F. and 180° F.

16. The process of claim 6 wherein:
    the waste heat has a temperature of between about 170° F. and 210° F.

17. The process of claim 1 wherein:
    the environmentally available fluid for condensing is seawater having a temperature between about 32° F. and 85° F.

18. The process of claim 1 wherein:
    the solvent has a boiling point between about 100° F. and 180° F., and heat for heating and vaporizing the solvent is extracted from heated internal combustion engine coolant at between about 170° F. and 210° F., and the vaporized solvent is condensed by heat transfer with coolant at a temperature of between about 32° F. and 85° F.

19. The process of claim 1 wherein:
    the solvent contains a halogenated hydrocarbon.

20. The process of claim 1 wherein:
    the solvent is selected from the group consisting of trichloro-trifluoroethane, methylene chloride, trichloro-trifluoroethane/methylene chloride azeotrope, ethylene dichloride, perchloroethylene, chloroform, methylchloroform and carbon tetrachloride.

21. The process of claim 3 wherein:
the solvent flowing countercurrently to the mixture of partially clean drill cutting and solvent is maintained in substantially laminar flow.

22. The process of claim 4 wherein:
the velocity of the solvent is controlled to permit undesirable drilling mud solids greater than certain predetermined diameters to flow against the moving solvent stream while causing desirable fines smaller than certain predesignated diameters to flow with the moving solvent stream.

23. The process of claim 22, wherein:
said undesirable solids are heavier drill cuttings which are cleaned of substantially all drilling mud by the countercurrent solvent flow to produce a mixture of cleaned drill solids covered with solvent.

24. The process of claim 23 wherein:
said mixture of clean drill solids covered with solvent are immersed in water and heated to remove the solvent to produce a mixture of water and solids for environmentally safe disposal.

25. The process in claim 22 wherein:
the velocity of countercurrent flow is created by the use of flow constrictions of predesignated diameter in order to control the velocity of the solvent.

26. The process of claim 22 wherein:
the desirable particles are oil-based drilling mud fines which are separated from said drill solids to provide a mixture of drilling mud fines and oil laden solvent.

27. The process of claim 22 wherein:
said solvent is a non-flammable, non-toxic solvent having a boiling point substantially lower than the oil dissolved therein.

28. A process for cleaning oil-based drilling mud from drill cuttings prior to environmentally acceptable disposal of the cuttings, which comprises:
a. collecting drill cuttings which are contaminated with drilling mud;
b. mixing the collected, contaminated drill cuttings with a solvent for the drilling mud to dissolve the drilling mud and to form a slurry containing the cuttings, which solvent has a low latent heat of vaporization between 50 and 250 BTU/pound and is liquid at ambient temperature and pressure, is substantially miscible with oil and substantially immiscible with water and vaporizes at a temperature below about 180° F.;
c. separating drill cuttings from the slurry to provide cuttings which are sufficiently free of oily contamination for environmentally acceptable disposal;
d. heating the solvent which contains drilling mud by heat transfer with waste heat normally available at the drilling site to vaporize the solvent from the drilling mud;
e. recovering the drilling mud for recycle to the drilling mud available for drilling; and
f. condensing the vaporized solvent for recycle in the process by heat transfer with environmentally available fluid at ambient temperatures.

29. A process for cleaning and separating organic liquids from contact with inorganic solids in order to prepare the inorganic solids for environmentally safe disposal and recover the organic liquids, comprising the steps of:
a. immersing the inorganic solids covered with organic liquids in a bath of solvent and subjecting said immersed inorganic solids covered with organic liquids to turbulent conditions in order to at least partially remove the organic liquids from the surface of the inorganic solids and produce a slurry of partially cleaned inorganic solids and solvent;
b. subjecting the partially cleaned inorganic solids to a countercurrent flow of solvent to remove any remaining organic liquids from contact with the inorganic solids such that the inorganic solids are substantially free of organic liquids;
c. recovering the inorganic solids for disposal under environmentally acceptable conditions; and
d. subjecting the remaining mixture of solvent and dissolved organic liquids to heat in order to separate the solvent by vaporization from the organic liquids and recycling the solvent for reuse in the process.

30. The process set forth in claim 29, wherein:
the steps are performed in a continuous process.

31. The process set forth in claim 29, wherein:
as part of the countercurrent flow step, separating the organic liquids by providing countercurrent flow at a predesignated velocity in order to remove the organic liquids by the countercurrent flow thus leaving the inorganic solids substantially free of organic liquids.

32. The process set forth in claim 29, wherein:
said solvent is in a substantially liquid state for the steps of immersing the organic liquids and subjecting the partially cleaned inorganic solids to the countercurrent flow of solvent.

33. The process set forth in claim 29, including:
the partially cleaned inorganic solids are subjected to countercurrent flow of solvent under conditions substantially in accordance with Stoke's Equation to separate finer particles associated with organic liquids from larger particles of inorganic solids.

34. The process set forth in claim 29, wherein:
the solvent has a boiling point between about 100° F. and about 180° F.

35. The process set forth in claim 29, wherein:
the solvent contains a halogenated hydrocarbon.

36. The process set forth in claim 29, wherein:
the solvent is selected from the group consisting of trichloro-trifluoroethane, methylene chloride, trichloro-trifluoroethane/methylene chloride azeotrope, ethylene dichloride, perchloroethylene, chloroform, methylchloroform and carbon tetrachloride.

37. Apparatus for cleaning oil-based drilling mud from drill cuttings in order to prepare the cuttings for environmentally acceptable disposal, comprising:
a. means for collecting drill cuttings which are contaminated with drilling mud;
b. means for contacting the contaminated drill cuttings with a solvent which is liquid at ambient temperature and pressure, substantially miscible with oil, and substantially immiscible with water, and having a boiling point between about 100° F. and about 180° F., to dissolve drilling mud in the solvent, to provide drill cuttings which are sufficiently free of oily contamination for environmentally acceptable disposal and leaving drilling mud-laden solvents;

c. means for transporting the environmentally acceptable drill cuttings to the environment;
d. means for heating the drilling mud-laden solvent with engine coolant to vaporize the solvent from the drilling muds;
e. means for recovering the drilling mud for further handling; and
f. means for condensing the vaporized solvent for recycling in the process by heat transfer with environmentally available fluid at ambient temperatures.

38. The apparatus set forth in claim 37, including:
said means for collecting the drill cuttings includes means for subjecting the drill cuttings to turbulent flow conditions with the solvent to substantially break any agglomeration of cuttings and to expose the surfaces of the drilling cuttings to the solvent to produce a mixture of partially cleaned drill cuttings and solvent.

39. The apparatus set forth in claim 38, including:
said means for contacting the contaminated drill cuttings with solvent including means for exposing the partially cleaned drill cuttings to countercurrent solvent flow to further clean the cuttings of drilling mud such that the cuttings are covered by solvent and are thus substantially free of drilling mud.

40. The apparatus set forth in claim 39, further including:
means for separating oil-based drilling mud fines of a predesignated mass from the heavier drill cuttings by the countercurrent flow of solvent to produce a stream of oil-laden solvent and a stream of heavier drill cuttings substantially covered with solvent.

41. The apparatus set forth in claim 40, wherein said means for separating further includes:
a substantially cylindrical separation column including an inlet for receiving a mixture of partially cleaned drill cuttings and solvent;
means for introducing clean solvent into the cleaning column;
one or more flow constrictions positioned in the column to cause the solvent flowing through the column to have a predesignated laminar flow velocity in order to separate oil-based drilling mud with a predesignated mass of fines from the heavier drill cuttings and to clean said drill cuttings of any remaining oil-based drilling mud.

42. The apparatus set forth in claim 37, including:
the means for heating the drilling mud-laden solvent to vaporize the solvent includes a bulk recovery distillation column and heating means including means for providing engine coolant to the bulk recovery distillation column or provided to vaporize the solvent.

43. The apparatus set forth in claim 37, including:
the means for condensing the vaporized solvent includes means for providing ambient seawater as a coolant.

* * * * *